United States Patent [19]

DeMario et al.

[11] Patent Number: 5,289,513
[45] Date of Patent: Feb. 22, 1994

[54] METHOD OF MAKING A FUEL ASSEMBLY LATTICE MEMBER AND THE LATTICE MEMBER MADE BY SUCH METHOD

[75] Inventors: Edmund E. DeMario; Charles N. Lawson, both of Columbia, S.C.

[73] Assignee: Westinghouse Electric Corp., Pittsburgh, Pa.

[21] Appl. No.: 968,011

[22] Filed: Oct. 29, 1992

[51] Int. Cl.$^5$ .............................................. G21C 3/34
[52] U.S. Cl. ................................ 376/438; 376/442; 376/462; 376/441
[58] Field of Search ............... 376/442, 261, 438, 462, 376/445, 446, 441; 29/742, 906, 723, 725; 976/DIG. 81, DIG. 80

[56] References Cited

U.S. PATENT DOCUMENTS

| | | | |
|---|---|---|---|
| 3,281,327 | 10/1966 | Webb et al. | 376/439 |
| 3,344,855 | 10/1967 | Clark | 165/159 |
| 3,393,128 | 7/1968 | Obertelli et al. | 376/439 |
| 3,787,285 | 1/1974 | Manstrand | 376/439 |
| 3,860,803 | 1/1975 | Levine | 235/151.1 |
| 3,862,000 | 1/1975 | Pugh et al. | 376/439 |
| 4,089,741 | 5/1978 | Patterson et al. | 376/439 |
| 4,192,170 | 3/1980 | Ferwagner | 72/414 |
| 4,547,335 | 10/1985 | Downs et al. | 376/442 |
| 4,604,785 | 8/1986 | Eddens | 29/463 |
| 4,666,663 | 5/1987 | Steinke | 376/441 |
| 4,705,663 | 11/1987 | Steven et al. | 376/442 |
| 4,728,489 | 3/1989 | Hatfield | 376/439 |
| 4,780,273 | 10/1988 | Dressel | 376/441 |
| 4,869,865 | 9/1989 | White et al. | 376/260 |
| 4,924,586 | 5/1990 | King, Jr. et al. | 29/723 |
| 4,933,138 | 6/1990 | Mouesca et al. | 376/442 |
| 4,985,199 | 1/1991 | Irube et al. | 376/442 |

OTHER PUBLICATIONS

Copending U.S. patent application Ser. No. 07/884,972, titled "A Nuclear Fuel Assembly for Increasing Utilization of Nuclear Fuel Contained Therein" filed May 15, 1992 in the name of David R. Stucker.
Copending U.S. patent application Ser. No. 07/968,647 titled "Fuel Assembly Including Deflector Vanes for Deflecting a Component of a Fluid Stream Flowing Past Such Fuel Assembly" filed Oct. 24, 1992 filed in the name of Edmund E. DeMario, et al.
Textbook titled "Materials and Processes in Manufacturing" by E. Paul DeGarmo, published by The MacMillan Company (1962, 2d. ed.).

Primary Examiner—Donald P. Walsh
Assistant Examiner—M. Chelliah

[57] ABSTRACT

Method of making a fuel assembly lattice member and the lattice member made by such method. The method includes placing a plurality of elongate metal straps on a computer controlled conveyor which successively conveys the straps into alignment with each of a plurality of computer controlled piercing and drawing dies belonging to a progressive die machine. The dies are selectively actuated by the computer to form such elements as curved deflector vanes and spring members on each strap member. After the piercing and drawing operations are completed, the straps are joined by welding to form a lattice member of hexagonal cross section, the lattice member defining a plurality of rhombic-shaped fuel rod cells and a plurality of generally rhombic-shaped guide tube thimble cells therethrough. The rod cells are capable of receiving respective ones of a plurality of fuel rods and the thimble cells are capable of receiving respective ones of a plurality of thimble tubes. The rhombic shape of the rod cells cooperate with the deflector vanes to deflect a component of a fluid stream about the longitudinal center axis of each fuel rod for maintaining liquid substantially single-phase fluid flow over the surface of each fuel rod in order to avoid Departure from Nucleate Boiling (DNB) on the surface of the fuel rods.

16 Claims, 10 Drawing Sheets

FIG. 5
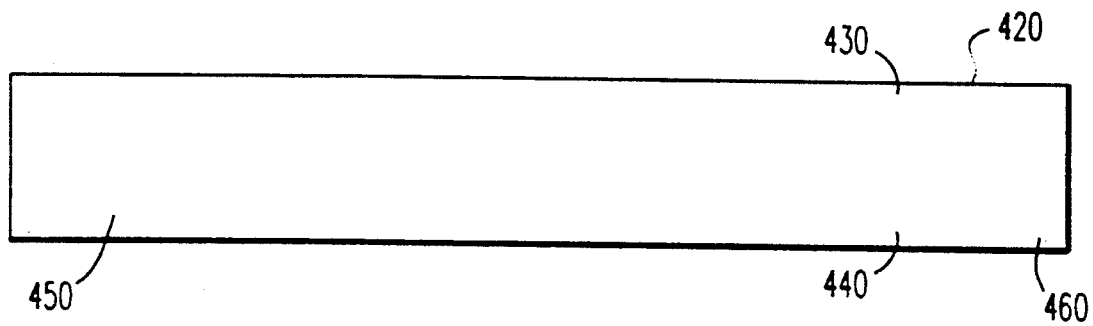
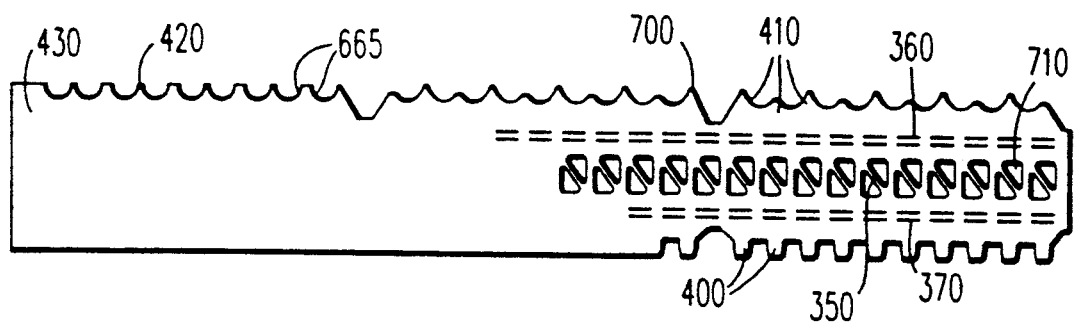
FIG. 8
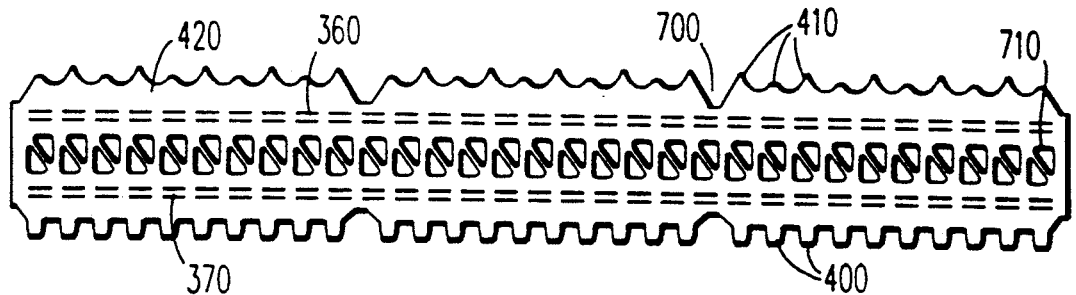
FIF. 10

METHOD OF MAKING A FUEL ASSEMBLY LATTICE MEMBER AND THE LATTICE MEMBER MADE BY SUCH METHOD

CROSS REFERENCE TO RELATED APPLICATIONS

This patent application is related to copending U.S. patent application Ser. No. 07/884,972 titled "A Nuclear Fuel Assembly For Increasing Utilization Of Nuclear Fuel Contained Therein" filed May 15, 1992 in the name of David R. Stucker and copending U.S. patent application Ser. No. 07/968,647 titled "Fuel Assembly Including Deflector Vanes For Deflecting A Component Of A Fluid Stream Flowing Past Such Fuel Assembly" filed Oct. 29, 1992 in the name of Edmund E. DeMario et al.

BACKGROUND

This invention generally relates to fuel assembly spacer grids and more particularly relates to a method of making a fuel assembly lattice member and the lattice member made by such method.

Fuel assembly spacer grids are known. One such spacer grid is disclosed in U.S. Pat. No. 3,281,327 titled "Nuclear Fuel Assemblies" issued Oct. 5, 1966 in the name of John Webb, et al. This patent discloses a spacer grid comprising a support member in the form of an outer metal sleeve of regular hexagonal cross-section. This patent also discloses that the spacer grid has a parallel array of spacer diaphragms adapted to be penetrated by fuel elements. According to this patent, the spacer diaphragms act as deflector vanes imparting to a main flow stream a component of flow transversely of the fuel elements. Although the Webb, et al. patent discloses a fuel assembly spacer grid comprising a support member in the form of an outer metal sleeve of regular hexagonal cross-section, the Webb et al. patent does not appear to disclose a method of making a fuel assembly lattice member and the lattice member made by such method, as described and claimed hereinbelow.

Another fuel assembly spacer grid is disclosed in U.S. Pat. No. 4,547,335 titled "Fuel Rod Support Grid" issued Oct. 15, 1985 in the name of Robert E. Downs et al. This patent discloses a support grid for triangular arrays of nuclear fuel rods associated with hexagonal fuel assemblies. Although the Downs, et al. patent discloses a support grid for hexagonal fuel assemblies, the Downs et al. patent does not appear to disclose a method of making a fuel assembly lattice member and the lattice member made by such method, as described and claimed hereinbelow.

Although the above recited patents disclose fuel assembly spacer grids, these patents do not appear to disclose a method of making a fuel assembly lattice member and the lattice member made by such method, as described and claimed hereinbelow.

Therefore, what is needed is a suitable method of making a fuel assembly lattice member and the lattice member made by such method.

SUMMARY

Disclosed herein is a method of making a fuel assembly lattice member and the lattice member made by such method. The method includes placing a plurality of elongate metal straps on a computer controlled conveyor which successively conveys the straps into alignment with each of a plurality of computer controlled piercing and drawing dies belonging to a progressive die machine. The dies are selectively actuated by the computer to form such elements as curved deflector vanes and spring members on each strap member. After the piercing and drawing operations are completed, the straps are joined by welding to form a lattice member of hexagonal cross section, the lattice member defining a plurality of rhombic-shaped fuel rod cells and a plurality of generally rhombic-shaped guide tube thimble cells therethrough. The rod cells are capable of receiving respective ones of a plurality of fuel rods and the thimble cells are capable of receiving respective ones of a plurality of thimble tubes. The rhombic shape of the rod cells cooperate with the deflector vanes to deflect a component of a fluid stream about the longitudinal center axis of each fuel rod for maintaining liquid substantially single-phase fluid flow over the surface of each fuel rod in order to avoid Departure from Nucleate Boiling (DNB) on the surface of the fuel rods.

An object of the present invention is to provide a method of making a fuel assembly lattice member and the lattice member made by such method.

Another object of the present invention is to provide a lattice member for a fuel assembly, the lattice member capable of deflecting a component of a fluid stream flowing past the fuel assembly, so that liquid substantially single-phase coolant flow is obtained over the surface of the fuel rods in order to avoid Departure from Nucleate Boiling (DNB) on the surface of the fuel rods.

A feature of the present invention is the provision of a method of making a fuel assembly lattice member comprising the steps of engaging a plurality of metal strap members with a computer controlled conveyor, successively advancing each strap member into alignment with a pneumatically actuatable deflector vane piercing die by controllably moving the conveyor and pneumatically actuating the deflector vane piercing die by operating the computer, so that each strap member is pierced to form at least one deflector vane thereon.

Another feature of the present invention is the provision of a method of making a lattice member comprising the steps of advancing a preselected pair of metal strap members into alignment with a pneumatically actuatable trihedral drawing die by controllably moving the conveyor; pneumatically actuating the trihedral drawing die by operating the computer to draw the pair of strap members such that each of the strap members obtains a trihedrally-shaped transverse cross section; and joining the pair of trihedrally-shaped strap members by activating a welding device so as to form an outer strap member having a regular hexagonally-shaped transverse contour.

Yet another feature of the present invention is the provision of a lattice member for a fuel assembly, the lattice member being capable of receiving elongate fuel rods therethrough and comprising a plurality of curved deflector vanes thereon for deflecting a component of a fluid stream flowing past the fuel assembly, such that the deflected component of the fluid stream swirls about the longitudinal center axis of each fuel rod.

An advantage of the present invention is that it obtains a cost-effective method of making lattice members, the method necessarily requiring only one machine set-up, rather than multiple machine set-ups, in order to efficiently make lattice members of varying designs.

Another advantage of the present invention is that it reduces fabrication time for making lattice members.

Yet another advantage of the present invention is that it obtains a lattice member that reduces the risk of tool hang-up and resulting damage to the lattice member during reactor refueling operations.

Still another advantage of the present invention is that it obtains a lattice member capable of reducing the risk of Departure from Nucleate Boiling (DNB) on the surface of each fuel rod passing through the lattice member.

These and other objects, features, and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

FIG. 5 is a view in elevation of a representative blank strap which is transformed by the method of the invention into either the first inner strap, the second inner strap or the outer strap;

FIG. 8 is a view in elevation of one of the blank straps after being partially metal worked by operation of the piercing dies;

FIG. 10 is a view in partial elevation of one of a preselected pair of blank straps belonging to the outer strap prior to being drawn into a regular trihedron by operation of a trihedral drawing die;

DESCRIPTION OF THE PREFERRED EMBODIMENTS

Figure 1:
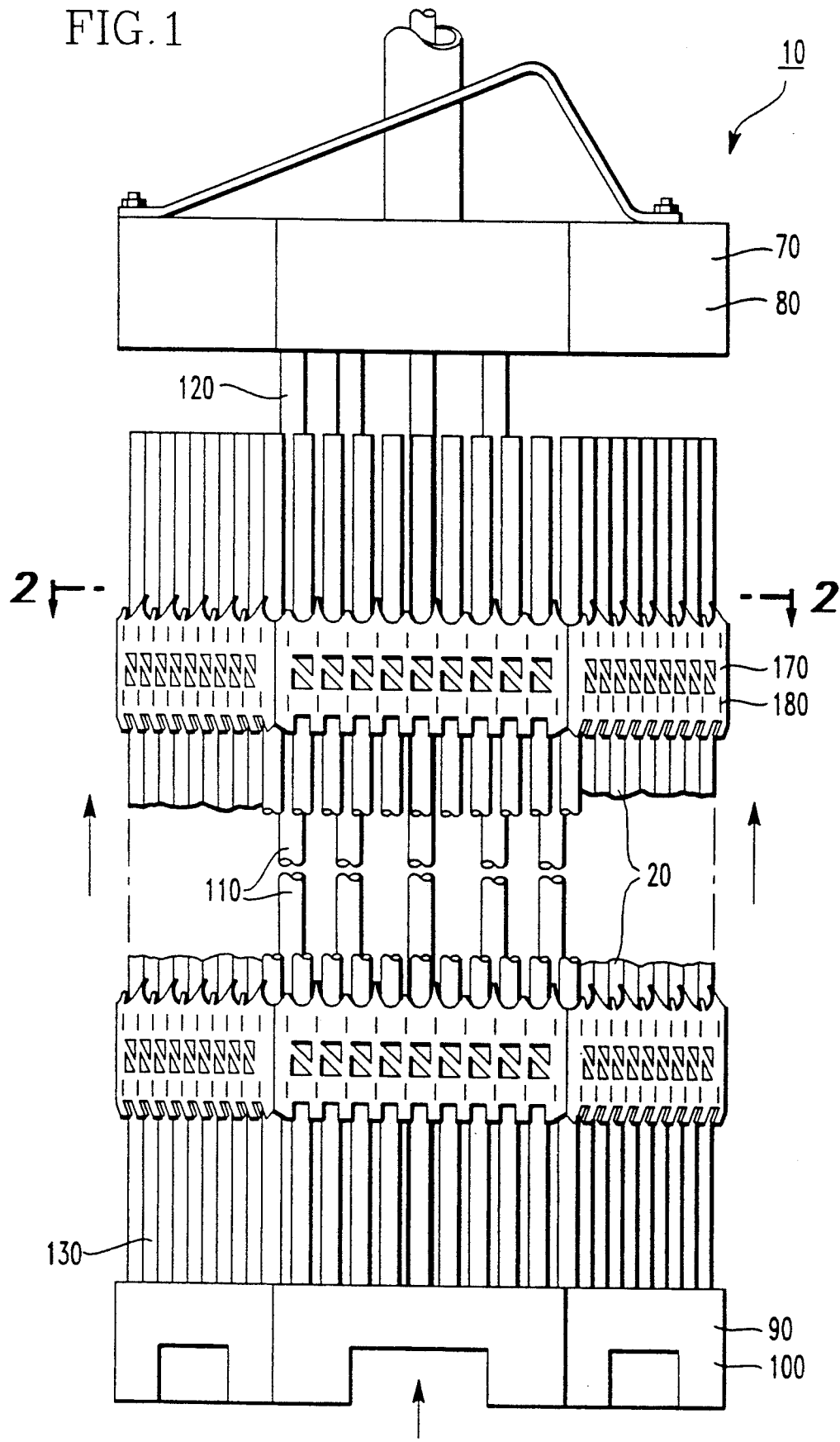
FIG. 1 is a view in elevation of a nuclear reactor fuel assembly having parts removed for clarity, the fuel assembly including a plurality of parallel fuel rods and a plurality of parallel guide thimble tubes extending through each of a plurality of spaced-apart coaxially aligned lattice members.
Figure 2:
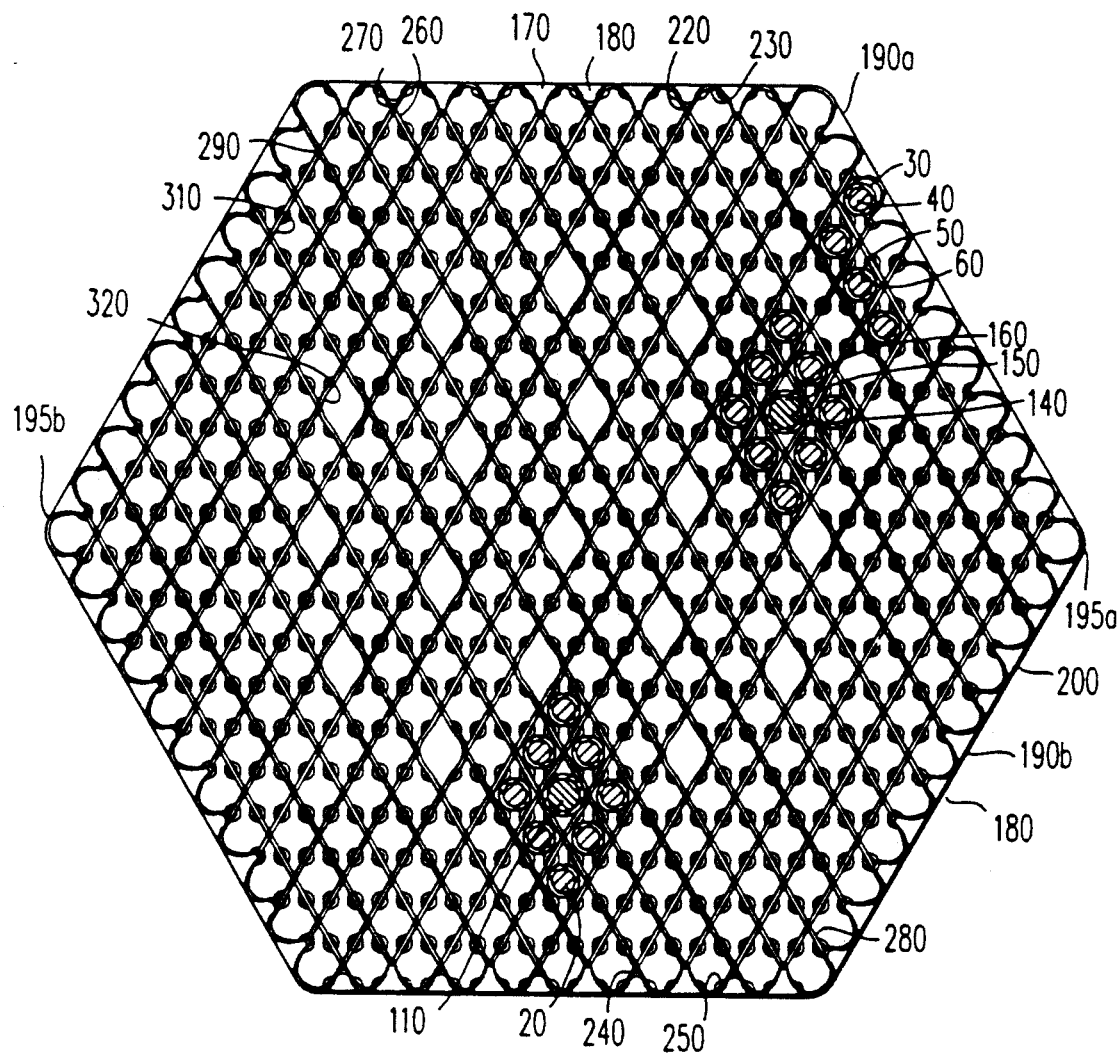
FIG. 2 is a plan view of one of the lattice members, this view of the lattice member having a number of the fuel rods and thimble tubes removed for clarity, this view of the lattice member also showing a plurality of intersecting first and second inner straps disposed interiorly of a hexagonally-shaped outer strap.

Referring to FIGS. 1 and 2, there is shown a nuclear fuel assembly, generally referred to as 10, for producing heat by the process of nuclear fission. Fuel assembly 10 comprises a plurality of elongate generally cylindrical fuel rods 20 vertically arranged in spaced parallel array. Fuel assembly 10 is capable of being disposed in a substantially unidirectional coolant flow stream (e.g., demineralized water), which flow stream removes the heat generated by the fission process occurring in fuel rods 20. The flow stream has a unidirectional flow axis substantially in the direction illustrated by the straight vertical arrows shown in FIG. 1. Each fuel rod 20 in turn comprises an elongate, hollow and generally cylindrical metal casing or cladding 30 for sealingly enclosing a plurality of generally cylindrical fuel pellets 40. Each fuel pellet 40 is formed from a nuclear fuel material comprising fissile nuclei uniformly dispersed in a matrix of fertile nuclei for generating heat by the process of nuclear fission. Cladding 30 has an inside diameter 50 and an outside diameter 60 and may be any suitable metal, such as "ZIRCALOY-4", or the like, having a relatively small microscopic absorption cross section for neutrons in order to reduce parasitic absorption of the neutrons. In this regard, "ZIRCALOY-4" is by weight composed of approximately 1.5% tin, 0.12% iron, 0.09% chromium, 0.05% nickel, and 98.24% zirconium. Fuel assembly 10 further comprises a first nozzle or first tie plate 70 having a bottom portion 80, which first tie plate 70 also may have a regular hexagonal transverse cross section. Coaxially aligned with and spaced-apart from first tie plate 70 is a second nozzle or second tie plate 90 having a top portion 100, which second tie plate 90 also may have a regular hexagonal transverse cross section.

Still referring to FIGS. 1 and 2, outwardly extending from bottom portion 80 of first tie plate 70 and attached thereto are a plurality of elongate, generally cylindrical control rod guide thimble tubes 110 arranged in spaced parallel array, each thimble tube 110 having a first end portion 120 and a second end portion 130. Each thimble tube 110 also has an inside diameter 140 and an outside diameter 150. First end portion 120 of each thimble tube 110 is attached to bottom portion 80 of first tie plate 70 and second end portion 130 of each thimble tube 110 is attached to top portion 100 of second tie plate 90 for providing rigidity and structural integrity to fuel assembly 10. Moreover, inside diameter 140 of each thimble tube 110 is sized to slidably receive an elongate generally cylindrical absorber rod or control rod 160 for controlling the fission process in fuel assembly 10. In this regard, each control rod 160 is made from a suitable material having a relatively large microscopic absorption cross section for neutrons. With particular reference to FIG. 2, only two thimble tubes 110 and only 20 fuel rods 20 are shown for clarity.

Referring to FIGS. 1, 2, 3, 4, and 5, spaced along the axial length of thimble tubes 110 and fuel rods 20 and coaxially interposed between first tie plate 70 and second tie plate 90 are a plurality of coaxially aligned lattice members, generally referred to as 170, for maintaining thimble tubes 110 and fuel rods 20 in their predetermined spaced parallel array configuration. Each lattice member 170 may be made from "ZIRCALOY-4", or the like, for the previously described reasons of neutron economy. Each lattice member 170 includes an outer strap 180 having a regular hexagonal transverse contour capable of being disposed edgewise in the fluid stream. Outer strap 180 comprises a pair of trihedral exterior straps 190a and 190b joined as at edges 195a and 195b for defining the hexagonal transverse contour of outer strap 180. Thus, each trihedral strap 190a and 190b has a regular trihedral transverse contour. When suitably joined, such as by welding at edges 195a and 195b, trihedral exterior straps 190a and 190b provide outer strap 180 with six integrally attached elongated side panels 200, each side panel 200 being disposed at a predetermined obtuse angle with respect to its adjacent side panel 200 for defining the regular hexagonally-shaped transverse contour of outer strap 180.

Still referring to FIGS. 1, 2, 3, 4 and 5, oriented edgewise in the fluid stream and transversely interiorly of outer strap 180 are a plurality of elongate, parallel and spaced-apart first interior or inner straps 210, each first inner strap 210 having a predetermined length. Each first inner strap 210 has a first end portion 220 integrally attached to an interior wall, such as interior wall 230, of outer strap 180 and a second end portion 240 integrally attached to another interior wall, such as inner wall 250, of outer strap 180. Each first inner strap 210 is disposed parallel to a preselected one of the side panels 200. Preselected ones of the inner straps 210 may have at least one bulged portion 255 for reasons disclosed hereinbelow. Moreover, oriented edgewise in the fluid stream and transversely interiorly of outer strap 180 are a plurality of elongate, parallel and spaced-apart second interior or inner straps 260, each second inner strap 260 having a predetermined length. Each second inner strap 260 has a first end portion 270 integrally attached to an interior wall of outer strap 180 and a second end portion 280 integrally attached to another interior wall of outer strap 180. In addition, preselected ones of the second inner straps 260 may have at least one bulged portion 285, for reasons disclosed hereinbelow. Each second inner strap 260 intersects and interlocks with each first inner strap 210 at an intersection plane 290 (see FIG. 3) to provide each lattice member 170 with an egg crate-like construction. In this regard, first inner strap 210 and second inner strap 260 are joined at intersection plane 290 and may be secured thereat, such as by weldments 300. In the preferred embodiment of the invention, each second inner strap 260 intersects each first inner strap 10 at an angle "φ" of approximately 29 degrees for defining a plurality of parallel rhombic-shaped rod cells 310 and a plurality of parallel generally rhombic-shaped thimble cells 320 through lattice member 170.

Referring again to FIG. 1, 2, 3, 4 and 5, each first inner strap 210 has a plurality of throughway slots 330 perpendicular to the downstream edge of first inner strap 210 and extending approximately to the mid-portion (i.e., to the longitudinal axis) of first inner strap 210 for reasons described presently. Moreover, each second inner strap 260 has a plurality of throughway slots 340 perpendicular to the upstream edge of second inner strap 260 and extending approximately to the mid-portion (i.e., to the longitudinal axis) of second inner strap 260 for reasons described presently. The purpose of slots 330/340 is to provide means for interlocking or interconnecting first inner straps 210 and second inner straps 260. That is, each slot 330 extending from the downstream edge of each first inner strap 210 is positioned so as to matingly engage its respective slot 340 formed in the upstream edge of second inner strap 260. Similarly, each slot 340 extending from the upstream edge of each second inner strap 260 is positioned so as to matingly engage its respective slot 330 formed in the downstream edge of first inner strap 210. In this manner, each first inner strap 210 is interlocked or interconnected with each second inner strap 260 to define the egg crate-like construction of lattice member 170 as slots 330/340 matingly engage. This egg crate-like construction provides maximum structural integrity to lattice member 170 while minimizing the weight of lattice member 170. Moreover, this egg crate-like construction ensures that as fuel rods 20 extend through their respective rod cells 310, they will obtain a densely packed triangular pitch array. It is to be appreciated that the terminology "downstream edge" is defined herein to mean that edge which is downstream of the fluid flow and the terminology "upstream edge" is defined herein to mean that edge which is upstream of the fluid flow.

Figure 3:
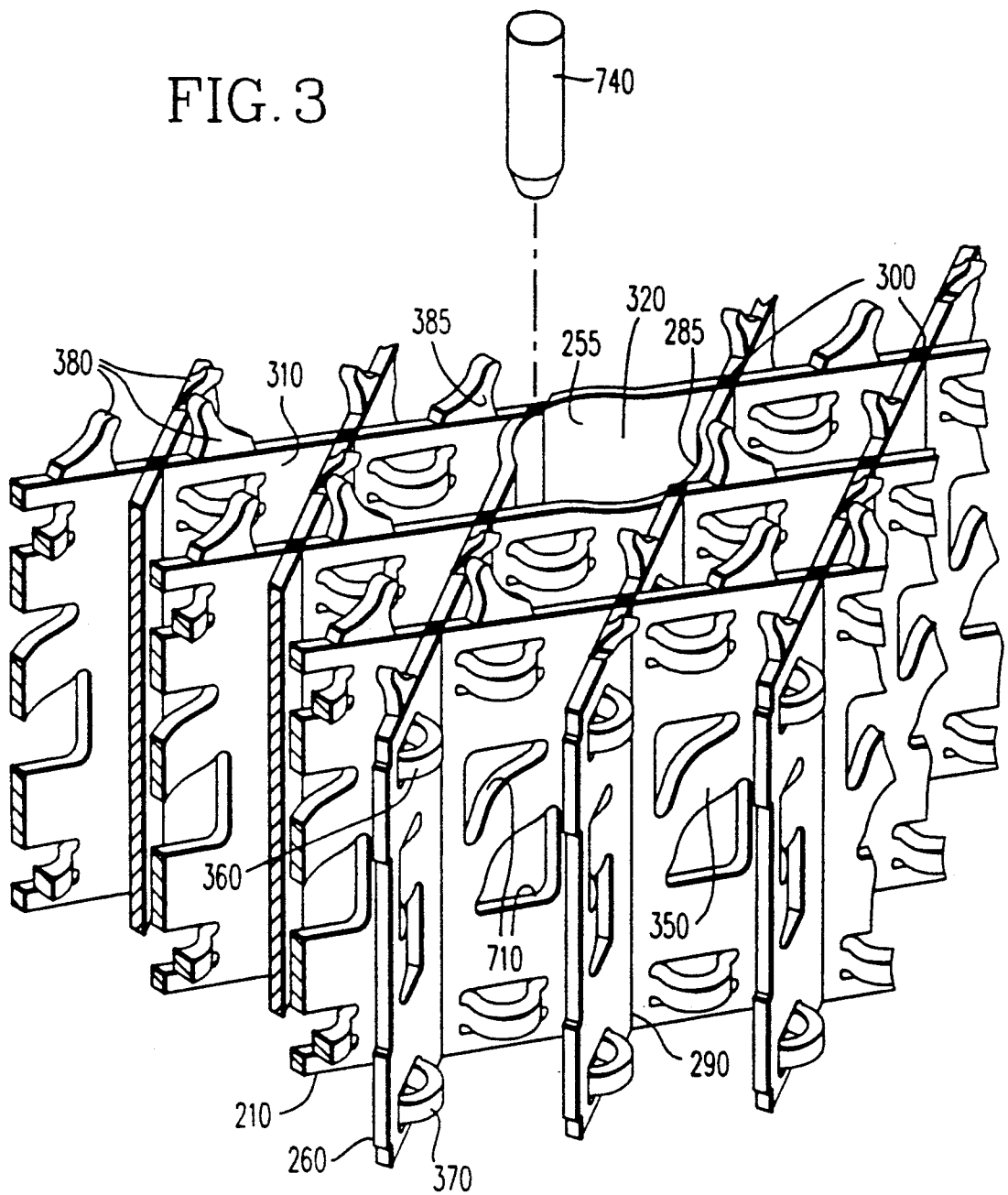
FIG. 3 is a fragmentation view in perspective of the lattice member and showing a laser welding device disposed nearby.

As best seen in FIG. 3, formed from the interior walls of each rod cell 310 and projecting inwardly therefrom is spring means, such as a plurality of resilient spring members 350, for frictionally supporting and retaining each fuel rod 20 in its associated rod cell 310, such that each fuel rod 20 does not move axially, laterally, or rotationally. Each spring member 350 is disposed at a predetermined acute angle, which angle may be approximately 45 degrees, with respect to a resilient first dimple 360 and a resilient second dimple 370, which dimples 368/370 are vertically coaxially aligned. Spring members 350, that are formed from the interior walls of each rod cell 310, frictionally support each fuel rod 20. In the preferred embodiment of the invention, first dimple 360 is disposed upstream of fluid flow, while second dimple 370 is disposed downstream of coolant fluid flow. Thus, it is understood from the above description that each rod cell 310 holds and supports its respective fuel rod 20 at six points of engagement or contact because four dimples and two spring members project inwardly into each rod cell 310 to frictionally engage each fuel rod 20.

Figure 4:
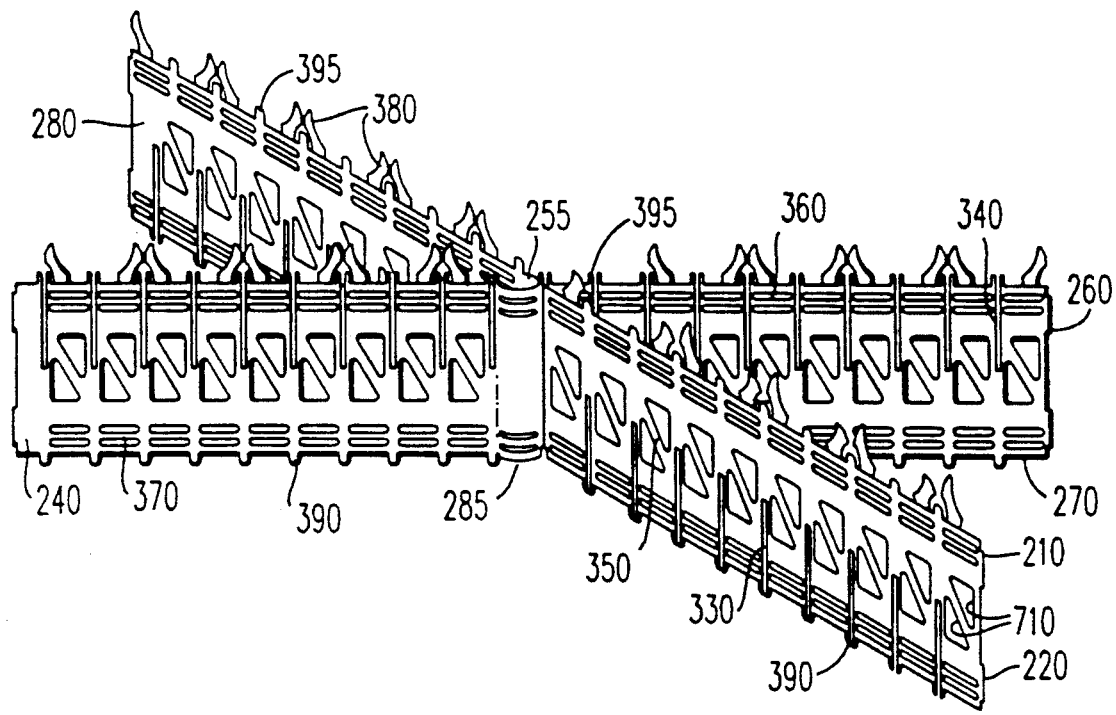
FIG. 4 is a view in perspective of one of the first inner straps belonging to the lattice member intersecting one of the second inner straps belonging to the lattice member.

Referring to FIGS. 2, 3, and 4, integrally attached to the upstream edge of each first inner strap 210 and each second inner strap 260 and associated with each rod cell 310 is deflector means, such as a plurality of spaced-apart deflector vanes 380, for deflecting a component of the fluid stream about the longitudinal center axis of each fuel rod 20, which fuel rod 20 extends through its respective rod cell 310. Each deflector vane 380 curvilinearly extends above and protrudes partially over its associated rod cell 310 obliquely to fluid flow for causing a vortex as the fluid stream flows through rod cell 310, such that the vortex helically swirls about the longitudinal center axis of fuel rod 20. Swirling the component of the fluid stream about the longitudinal center axis of each fuel rod 20 assists in maintaining liquid substantially single-phase coolant flow over the surface of each fuel rod 20. This is important because maintaining liquid substantially single-phase coolant flow over the outside diameter 60 (i.e., the outside surface) of the fuel rod 20 assists in avoiding DNB on the surface of fuel rod 20. In the preferred embodiment of the invention, the plurality of deflector vanes 380 may be a pair of deflector vanes. Thus, when first inner straps 210 and second inner straps 260 are suitably interlocked, as previously described, each rod cell 310 will have two deflector vanes 380 associated with it.

Still referring to FIGS. 2, 3, and 4, each deflector vane 380 upwardly curvilinearly extends from the upstream edge of each first inner strap 210 and each second inner strap 260 to a predetermined distance above rod cell 310 and inwardly protrudes over each rod cell 410 for redirecting the fluid flow stream flowing through rod cell 310. In this regard, each deflector vane 380 has a curved undersurface 385 for generating the previously mentioned vortex which is centered about the longitudinal center axis of fuel rod 20. The two deflector vanes 380 associated with each rod cell 310 are oppositely oriented with respect to each other so that the two spiral vortices created by the pair of deflector vanes 380 do not flow counter-current to each other. This is important because counter-current flow would otherwise disrupt the helical spiral flow pattern created by the vortices. Such counter-current flow would result in a condition where liquid substantially single-phase flow over the surface of fuel rod 20 might not be obtained. In addition, the two deflector vanes 380 associated with each rod cell 310 are located such that one of the two deflector vanes 380 is disposed sufficiently near each extreme corner of rod cell 310. That is, the two deflector vanes 380 are grouped generally symmetrically on the longest diagonal of rod cell 310. Moreover, each first and second inner strap 210/260 may have a plurality of spaced-apart tabs 390 integrally attached to and outwardly extending from the downstream edge of each first and second inner strap 210/260 and parallel to the fluid stream to provide weld material for welding first and second inner straps 210/260 together first and second inner straps 210/260 are suitably interlocked. Similarly, each first and second inner strap 210/260 may have a plurality of spaced-apart tabs 395 integrally attached to and outwardly extending from the upstream edge of each first and second inner strap 210/260 and parallel to the fluid stream to provide weld material for welding first and second inner straps 210/260 together after first and second inner straps 210/260 are suitably interlocked. In addition, outer strap 180 may also include a plurality of spaced-apart inwardly bent tabs 400 integrally attached to and downwardly extending from the downstream edge of outer strap 180 for easily sliding a first fuel assembly 10 past a second fuel assembly 10 during refueling operations, so that the first fuel assembly 10 will not snag or "hang-up" on the second fuel assembly 10. Furthermore, outer strap 180 may include a plurality of spaced-apart inwardly curved deflector fins 410 integrally attached to the upstream edge of outer strap 180 for deflecting a component of the fluid stream onto the fuel rods 20 that are located along the inside periphery of outer strap 180. In this regard, each deflector fin 410 has a generally pyramid-shaped contour and is integrally attached at its base to the upstream edge of outer strap 180 and also extends above and partially over its associated rod cell 310. The structure and operation of fuel assembly lattice member 170 is fully disclosed in U.S. patent application Ser. No. 07/968,647 titled "Fuel Assembly Including Deflector Vanes ;For Deflecting A Component Of A Fluid Stream Flowing Past Such Fuel Assembly" filed the same day as the present patent application in the name of Edmund E. DeMario et al., and assigned to the assignee of the present invention, the disclosure of which is hereby incorporated by reference.

The time required to make lattice member 170 can be reduced by selection of a suitable fabrication method. Such a method should be cost effective by being automated and by requiring only one machine set-up rather than multiple machine set-ups to efficiently fabricate lattice members 170 of various designs. A method of making such lattice members 170 is disclosed hereinbelow.

Therefore, referring to FIG. 5, there is shown a representative one of a plurality of elongate, generally rectangular blank straps 420, which is transformed, by the method of the invention, into outer strap 180, the plurality of first inner straps 210, or the plurality of second inner straps 260. Each blank strap 420 includes a top border portion 430, a bottom border portion 440 extending parallel to top border portion 430, a left border portion 450 extending perpendicular to top and bottom border portions 430/440, and a right border portion 460 extending parallel to left border portion 450, for defining the generally rectangular shape of blank strap 420. Blank strap 420 may be "ZIRCALOY-4", or the like, for the previously described reasons of neutron economy.

Figure 6:
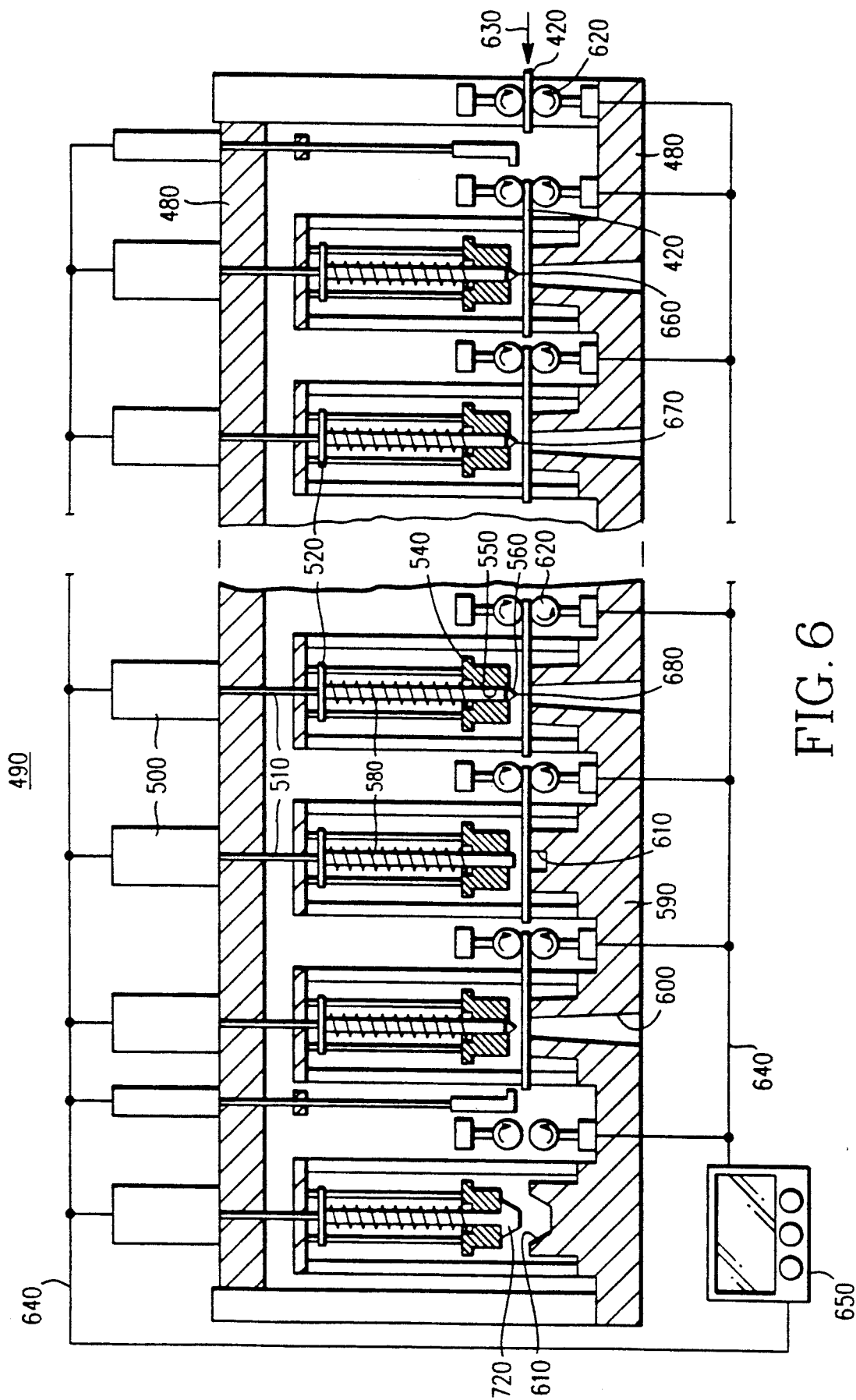
FIG. 6 is a view in partial elevation of a progressive die machine comprising a plurality of pneumatically actuatable drawing and piercing die assemblies for transforming the blank strap into either the first inner strap, the second inner strap, or the outer strap.
Figure 7:
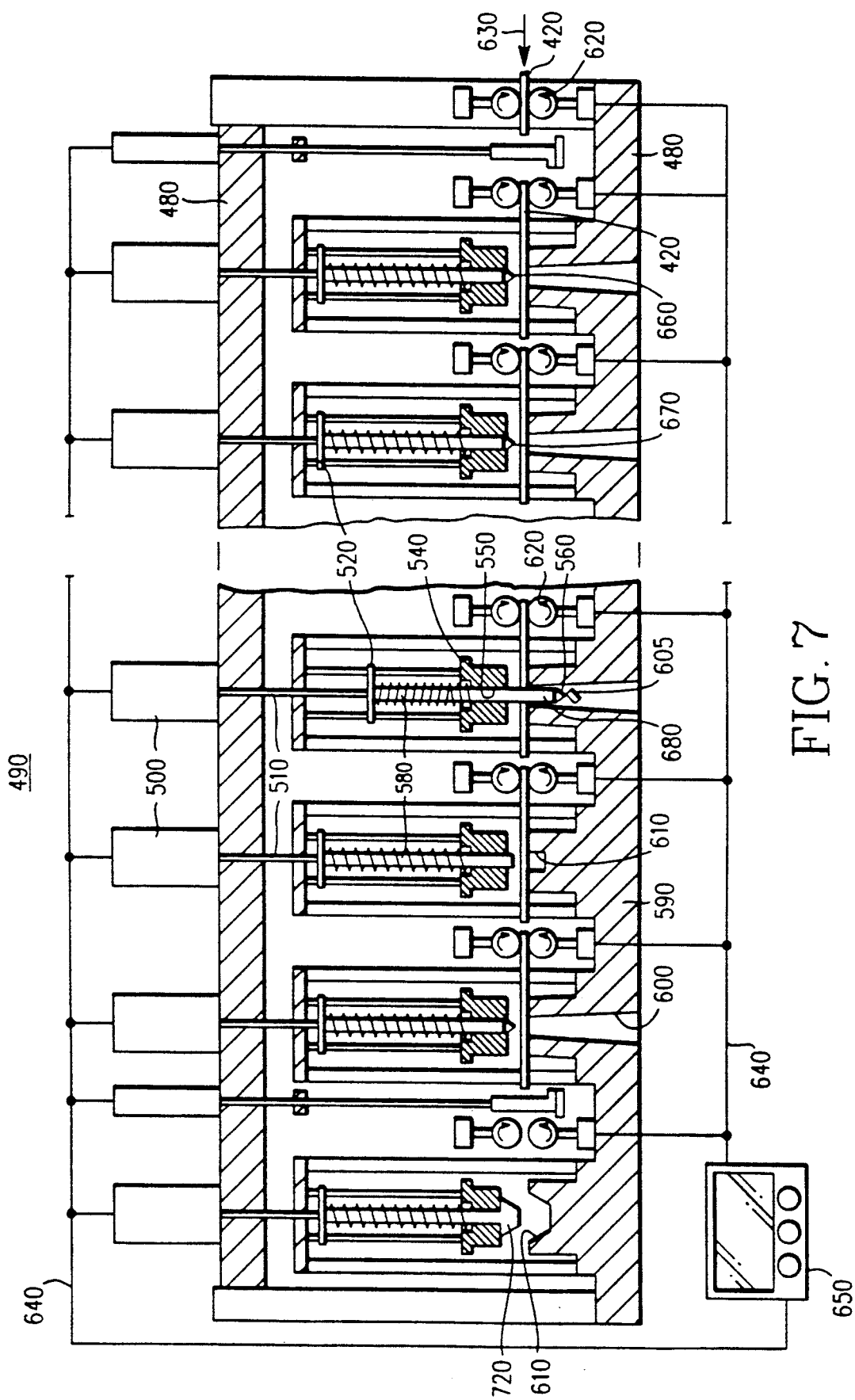
FIG. 7 is a view in partial elevation of the progressive die machine showing a piercing die piercing one of a plurality of blank straps.

Referring now to FIGS. 6 and 7, there is schematically illustrated, with parts removed for clarity, a progressive die machine, generally referred to as 470, for transforming the plurality of blank straps 420 into outer strap 180, the plurality of first inner straps 210, and the plurality of second inner straps 260. As well understood in the art, a progressive die machine includes a plurality of piercing (i.e., punching) and/or drawing die assemblies arranged in tandem. It is also well understood by persons having ordinary skill in the art that the terminology "piercing" means a shearing operation in which the piece of metal punched-out by the piercing die assembly is waste or scrap, the remainder of the metal which was placed into the piercing die assembly constituting the workpiece (i.e., strap 420) that may be subject to further metal working operations (e.g. further piercing and drawing). The terminology "drawing" means a cold forming operation in which a drawing die assembly causes plastic flow to occur along a curved axis in the workpiece (i.e., strap 420). As described more fully hereinbelow, piercing is used in the method of the invention to cut-out at least deflector vanes 380, tabs 390, tabs 400, and deflector fins 410 while drawing is used in the method of the invention to form at least trihedral exterior straps 190a/190b, bulged portions 255/285, spring members 350, first dimples 360, and second dimples 370. The piercing and/or drawing die assemblies may be arranged along any convenient path, such as a linear path, a generally circular path or a generally oval path.

Still referring to FIGS. 6 and 7, progressive die machine 470 comprises a frame 480 on which is mounted a plurality of pneumatically actuatable piercing and drawing die assemblies, collectively and generally referred to as 490. For example, die assemblies 490 may be gas (e.g., air) or hydraulically (e.g., oil or water) actuated. Die assemblies 490 are pneumatically actuatable in order to be quick-acting. In the preferred embodiment of the invention, each die assembly 490 is air actuated and includes an air operated motor or air cylinder 500, connected to an elongate ram shaft 510, for axially reciprocating ram shaft 510. Ram shaft 510 is attached to a cross bar 520, which in turn slidably engages a plurality of elongate guide pins 530 to allow cross bar 520 to slidably reciprocate axially along guide pins 530, as ram shaft 510 is reciprocated by air cylinder 500. Affixed to an end portion of guide pins 530 may be a stripper block 540 having a step bore 550 therethrough for reasons described hereinbelow. Extending outwardly from cross bar 520 and into step bore 550 is a piercing die 560 or a drawing die 570 depending on the particular metal working operation to be performed. Piercing die 560 is capable of piercing blank strap 420 and drawing die 570 is capable of drawing blank strap 420. When reciprocated, piercing die 560 or drawing die 570 is downwardly translated to perform its respective piercing or drawing operation and then upwardly translated to its original position by pneumatic operation of air cylinder 500. In an alternative embodiment of the invention, means may be provided for upwardly recoiling piercing die 560 or drawing die 570 after being downwardly translated and then released by air cylinder 500. With respect to this alternative embodiment, surrounding piercing die 560 or drawing die 570 may be means for providing recoil to piercing die 560 and drawing die 570, such as a recoil spring 580 having one end thereof abutting cross bar 520 and another end thereof disposed in the larger diameter of step bore 550 for upwardly biasing piercing die 560 or drawing die 570 after piercing die 560 or drawing die 570 is downwardly translated and then released by air cylinder 500. Moreover, integrally attached to frame 480 and coaxially aligned beneath each stripper block 540 is an anvil or bolster member 590 for supporting blank strap 420 thereon. Bolster member 590 may have a channel 600 therethrough for receiving the scrap metal 605 punched-out or pierced by piercing die 560. Bolster member 590 may alternatively have a cavity 610, rather than channel 600, therein of predetermined contour for precisely drawing blank strap 420 into a complementary contour corresponding to the contour of cavity 610.

Figure 9:
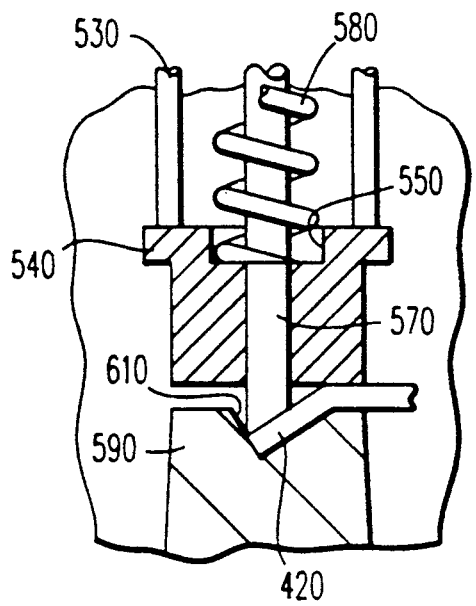
FIG. 9 is an enlarged view in partial elevation of one of the die assemblies drawing deflector fins in one of the blank straps.
Figure 11:
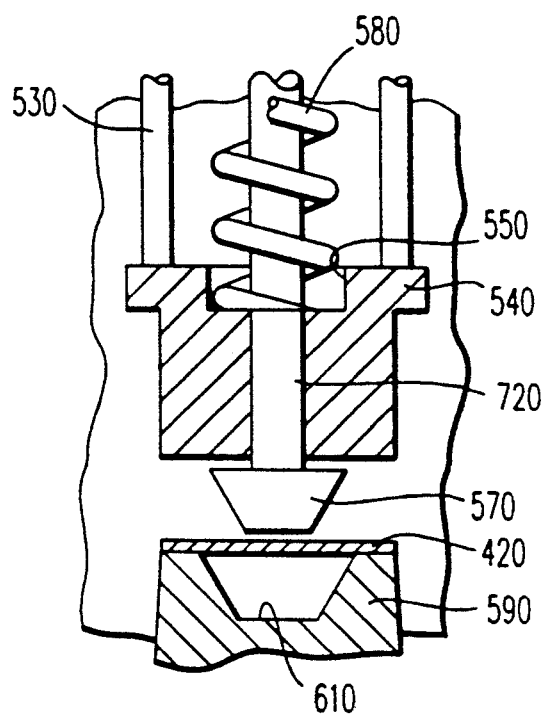
FIG. 11 is a view in partial elevation of the trihedral drawing die in operative condition to draw one of the preselected pair of blank straps into a regular trihedron.
Figure 12:
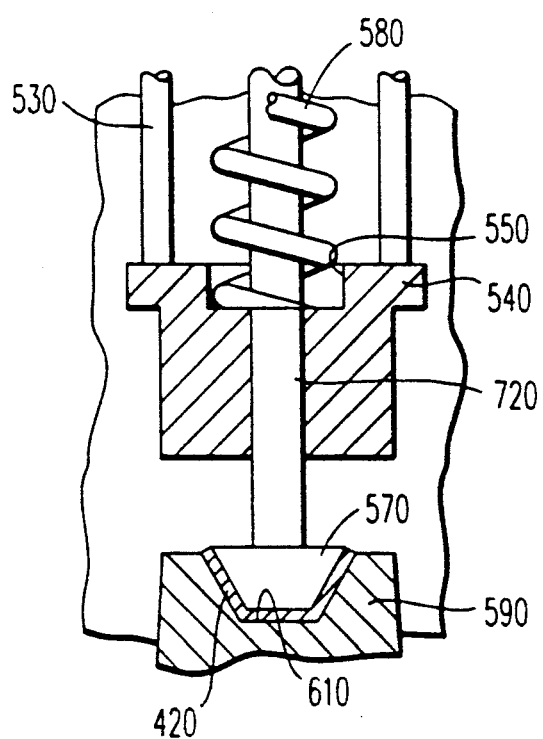
FIG. 12 is a view in partial elevation of the trihedral drawing die in the act of drawing one of the pair of blank straps into a regular trihedron.
Figure 13:
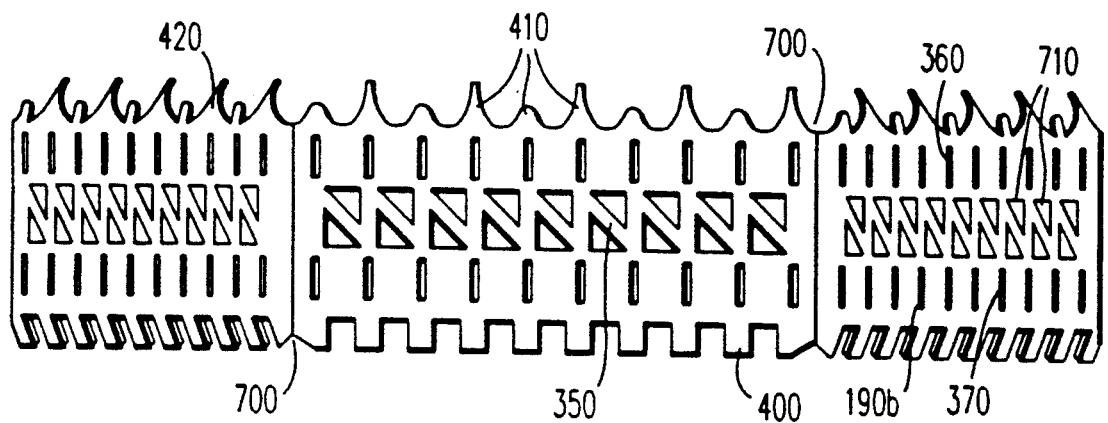
FIG. 13 shows, in elevation, a blank strap after being drawn into a regular trihedron by operation of the trihedral drawing die.
Figure 14:
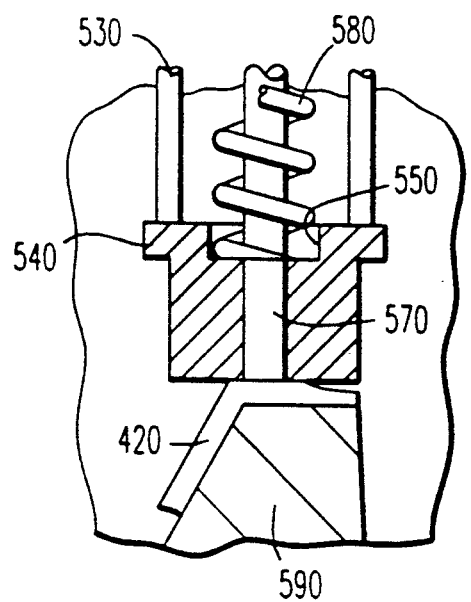
FIG. 14 illustrates, in partial elevation, a blank strap being coined by a coining die.

Referring again to FIGS. 9 and 10, connected to frame 480 is conveyor means, such as a plurality of computer controlled motorized rollers 620, for conveying blank straps 420 along a predetermined circuit 630 extending through progressive die machine 470. Circuit 630 passes between each set of stripper blocks 540 and bolster members 590 such that each blank strap 420 passes under either piercing die 560 and/or drawing die 570. In the preferred embodiment of the invention, circuit 630 follows a linear path as illustrated by the horizontal arrows in FIGS. 6 and 7. It is appreciated that circuit 630 alternatively may pass through progressive die machine 470 along any convenient path, such as a generally circular path or a generally oval path depending on the spatial arrangement of die assemblies 490. Moreover, circuit 630 may define an interconnecting network of paths depending on the spatial arrangement of die assemblies 490. In addition, the conveyor means need not be rollers; rather, the conveyor means may be a conveyor belt, a chain, and/or a plurality of mechanical gripper-manipulators (not shown) for conveying each blank strap 420 along circuit 630.

Still referring to FIGS. 6 and 7, electrically connected to rollers 620 and to air cylinders 500, such as by electrically conducting wires 640, is computer means, such as a pre-programmed computer 650. Computer 650 is capable of selectively controllably moving (i.e., rotating) any one or all of the rollers 620 and selectively pneumatically actuating any one or all of the air cylinders 500 according to a predetermined computer program (not shown) stored in computer 650.

Turning now to FIGS. 8–15, a preselected one of the dies, such as a pilot hole piercing die 660, is used to pierce a plurality of pilot holes 665 in the top and/or bottom borders 430/440 of blank strap 420. Pilot holes 665 allow blank strap 420 to be precisely positioned, in a manner well known in the art, under each of the preselected die assemblies 490 during the metal working operations. Another piercing die, such as deflector vane piercing die 670, is used in the manner disclosed hereinbelow to pierce deflector vanes 380 in top border 430 of blank strap 420. Similarly, a tab piercing die 680 may be used in the manner disclosed hereinbelow to pierce tabs 390, 395 and 400. Moreover, a deflector fin piercing die 690 may be provided to pierce deflector fins 410. Furthermore, a trimming die, similar to piercing die 560, may be provided for trimming blank strap 420. As well understood in the art, "trimming" is used to remove the excess metal which remains after a drawing operation. In addition, it will be understood from the disclosure hereinabove, that there may be additional piercing dies for performing other piercing operations, such as a piercing die similar to piercing die 560 for forming notch 700 in top and bottom borders 430/440 of blank strap 420, if desired, or for forming spring cut-outs 710 that define spring members 350.

Referring again to FIGS. 8–15, cavity 310 has a predetermined contour for curving each deflector vane 380 as a deflector vane drawing die, such as a drawing die similar to drawing die 570, is downwardly translated by its respective air cylinder 500 to engage blank strap 420 (see FIG. 12). Similarly, cavity 610 may have a predetermined contour for curving each deflector fin 410 as a deflector vane drawing die, such as a drawing die similar to drawing die 570, is downwardly translated by its respective air cylinder 500 to engage blank strap 420. In addition, cavity 610 may have a predetermined contour for forming each trihedral strap 190a/190b as a trihedral drawing die 720 is downwardly translated by its respective air cylinder 500 to engage blank strap 420 (see FIGS. 11, 12 and 13). Furthermore, cavity 610 may have a predetermined contour for coining bottom border 440 of blank strap 420 as a coining die, which may be a drawing die similar to drawing die 570, is downwardly translated by its respective air cylinder 500 to engage blank strap 420 (see FIG. 14). As is well understood in the art, "coining" involves cold working by means of a drawing die while the workpiece (i.e., blank strap 420) is completely confined between a bolster member and die. Coining bottom border 440 assists in reducing the hydraulic pressure drop across lattice member 170 as lattice member 170 is disposed transversely in the fluid stream.

Figure 15:
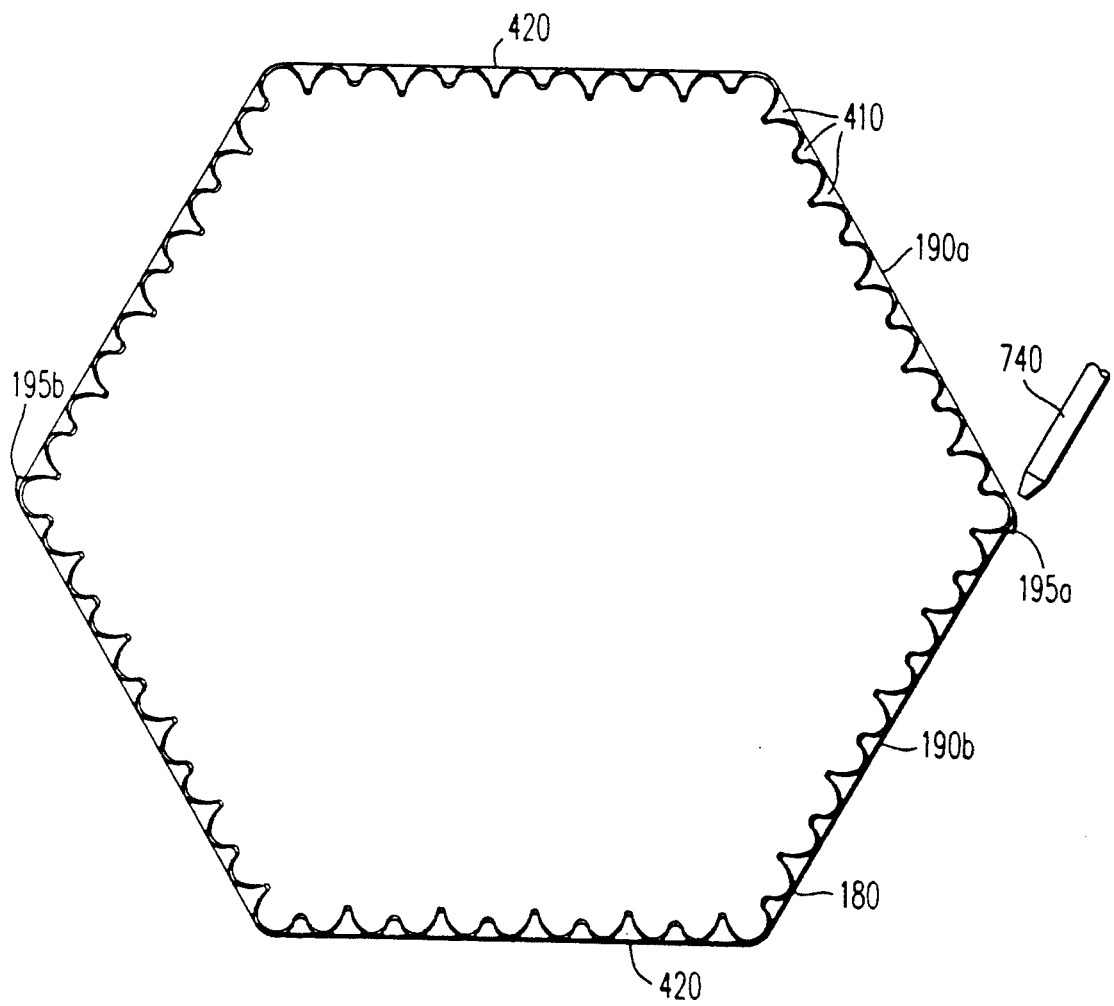
FIG. 15 is a plan view of the assembled outer strap after the pair of trihedrally-shaped straps has been joined to form the outer strap into a regular hexagonal transverse cross section.

Referring now to FIGS. 3 and 15, a laser welding device 740 is provided for precisely joining first inner straps 210 to second inner straps 260 via weldments 300 placed at the outwardly projecting weld tabs located at intersection plane 290. Laser welding device 740 is also used to weld trihedral exterior straps 190a/190b, as at edges 195a/195b, for joining trihedral exterior straps 190a/190b in such a manner that outer strap 180 obtains a hexagonal transverse contour. Use of a laser welding device, such as laser welding device 740, is preferred because of its ability to provide precisely placed weldments.

OPERATION

As the fluid stream flows past fuel assembly 10, it will pass through each rhombic-shaped rod cell 310 defined by lattice member 170. Deflector vanes 380 deflect the fluid stream inwardly toward the exterior surface of each fuel rod 20 to avoid partial or stable film boiling thereon and thus to avoid Departure from Nucleate Boiling (DNB) on the surface of the fuel rod 20. Avoiding DNB on the surface of fuel rods 20 in turn avoids possible damage to fuel rods 20.

In this regard, the rhombic transverse contour of each rod cell 310 cooperates or coacts with the curved undersurface 385 of each deflector vane 380 to generate a vortex so that DNB is avoided. That is, the rhombic shape of each rod cell 310 obtains a relatively small or restricted transverse flow area to fluid flow. Therefore, because of the restricted transverse flow area of rod cell 310, which is provided by the rhombic shape of rod cell 310, more of the fluid stream flowing upwardly through rod cell 310 will be forced to contact the undersurface 385 of each deflector vane 380, as the fluid stream exits rod cell 310. This is so because each deflector vane extends above and partially over its associated rod cell 310 obliquely to fluid flow for deflecting the fluid flow. Generation of such a vortex maintains liquid substantially single-phase coolant flow on the exterior (i.e., outside diameter 60) of fuel rod 20 in order to avoid DNB.

The method of making lattice member 170 in progressive die machine 490 will now be disclosed. In this regard, rollers 620 are controllably operated to provide computer controlled conveyor means along circuit 630, which circuit 630 extends through progressive die machine 490 along any convenient path, such as a linear, circular, or oval path depending on the spatial arrangement of die assemblies 470. Rollers 620 are controllably rotated by operating computer 650 according to the predetermined computer program stored in computer 650. Rollers 620 successively convey each of the plurality of blank straps 420 along circuit 630 because each blank strap 420 is caused to engage rollers 630. As rollers 620 rotate, blank straps 420 are successively advanced along circuit 630 and into coaxial alignment with pneumatically actuatable pilot hole piercing die 660. Air cylinder 500 corresponding to pilot hole piercing die 660 is selectively operated by computer 650 to actuate pilot hole piercing die 660 for piercing a plurality of pilot holes 665 in each blank strap 420, which pilot holes 665 allow each blank strap 420 to be precisely positioned, in a manner well known in the art, under the remaining preselected die assemblies 490 during subsequent metal working operations.

Next, blank straps 420 may be successively advanced along circuit 630 and into coaxial alignment with preselected pneumatically actuatable deflector vane piercing die 670 by controllably moving rollers 630 according to the computer program stored in computer 650. Computer 650 selectively operates air cylinder 500 corresponding to deflector vane piercing die 670 to pneumatically actuate deflector vane piercing die 670, so that each blank strap 420 is pierced to form a plurality of deflector vanes 380 in the top border portion 430 of blank strap 420. The plurality of blank straps 420 are also successively advanced along circuit 630 and into coaxial alignment with the preselected pneumatically actuatable deflector vane drawing die by controllably moving rollers 630 according to the computer program. Computer 650 then selectively operates air cylinder 500 corresponding to the deflector vane drawing die to pneumatically actuate the deflector vane drawing die, so that each deflector vane is drawn into a predetermined curvature. The deflector vane drawing die thus forms a plurality of curved deflector vanes 380 integrally attached to top border portion 430 of each blank strap 420. Blank straps 420 are advanced to another one of the drawing dies, which belongs to die assemblies 490, for forming bulged portion 255 in preselected ones of the first inner straps 210 and bulged portion 285 in preselected ones of the second inner straps 260. In this manner, each thimble cell 320 will have a drawn bulged portion 255/285 for surrounding its respective thimble tube 110 which has a larger outside diameter 150 than the outside diameter 60 of fuel rod 20. Blank straps 420 having deflector vanes 380 thereon may also be advanced to a lancing die, which belongs to die assemblies 490, for lancing throughway slots 330 in first inner straps 210 and throughway slots 340 in second inner straps 260. As well understood in the art, "lancing" is a piercing operation which forms a slit in the workpiece (i.e., blank strap 420).

Moreover, the plurality of blank straps 420 may be successively advanced along circuit 630 and into coaxial alignment with the preselected pneumatically actuatable spring cut-out piercing die by controllably moving rollers 630 according to the computer program stored in computer 650. Computer 650 selectively operates air cylinder 500 corresponding to the spring cut-out piercing die to pneumatically actuate the spring cut-out piercing die, so that each blank strap 420 obtains a plurality of spaced-apart paired spring cut-outs 710. As described presently, each pair of spring cut-outs 710 defines the spring member 350 therebetween (e.g., see FIG. 3). Blank straps 420 are also successively advanced along circuit 630 and into coaxial alignment with a preselected pneumatically actuatable spring drawing die by controllably moving rollers 630 according to the computer program stored in computer 650. Computer 650 selectively operates air cylinder 500 corresponding to the spring drawing die to pneumatically actuate the spring drawing die, so that each blank strap 420 is drawn to form a raised portion thereon defining resilient spring member 350 between each pair of spring cut-outs 710, each spring member 350 being formed near the longitudinal center axis of each blank strap 420.

The method of constructing outer strap 180 will now be described. In this regard, a preselected pair of blank straps 420 of predetermined length are successively advanced along circuit 630 and into coaxial alignment with a preselected pneumatically actuatable deflector fin piercing die by controllably moving rollers 630 according to the computer program stored in computer 650. Computer 650 selectively operates air cylinder 500 corresponding to the deflector fin piercing die to pneumatically actuate the deflector fin piercing die, so that the pair of blank straps 420 are pierced to form the plurality of adjacent deflector fins 410 in the top border of each of the pair of straps 420. The pair of blank straps 420 are also successively advanced along circuit 630 and into coaxial alignment with a preselected pneumatically actuatable deflector fin drawing die by controllably moving rollers 630 according to the computer program. Computer 650 selectively operates air cylinder 500 corresponding to the deflecting fin drawing die, so that each deflector fin 410 is drawn to provide a predetermined curvature to each deflector fin 410. The preselected pair of blank straps 420 are also successively advanced along circuit 630 and into coaxial alignment with the preselected pneumatically actuatable trihedral drawing die 720 by controllably moving rollers 630 according to the computer program stored on computer 650. Computer 650 then selectively operates air cylinder 500 corresponding to trihedral drawing die 720 to pneumatically actuate trihedral drawing die 720 for drawing each of the preselected pair of blank straps 420 into the shape of a regular trihedron (i.e., a regular trapezoid with its longest side absent). In this manner, the preselected pair of blank straps 420 are drawn into the regular trihedral exterior straps 190a/190b as the trihedral drawing die 729 is actuated. Trihedral exterior straps 190a/190b are then joined at their edges 195a/195b by aligning laser welding device 740 with edges 195a/195b and then activating laser welding device 740 to laser weld edges 195a/195b. In this manner, trihedral exterior straps 190a/190b are joined by welding to form outer strap 180 having a regular hexagonal transverse contour.

It will be understood from the description hereinabove that the end portions 220/240 of first inner straps 210 and the end portions 270/280 of second inner straps 260 are suitably joined to their respective interior wall 230 of outer strap 180 (i.e., the inside surface of side panels 200) by suitably activating laser welding device 740. Thus, it will be appreciated from the discussion hereinabove that the matrix of straps comprising the plurality of first inner straps 210 and second inner straps 260 are laser welded to outer strap 180 such that they are surrounded by outer strap 180 for defining hexagonal lattice member 170.

It will also be understood from the description hereinabove that the method of the invention necessarily requires only one set-up of progressive die machine 470 to selectively make lattice members of varying designs. This is so because preselected drawing, piercing, lancing and coining dies corresponding to different anticipated designs for lattice member 170 may be initially set-up (i.e., installed) on progressive die machine 470. Computer 650 is then operated to rotate rollers 620 so as to selectively route blank straps 420 along circuit 630 only to those preselected dies required to make the lattice member of a predetermined design. For example, if dimples 360/370 are not desired for a lattice member of a predetermined design, then computer 650 may cause blank straps 420 to bypass the dimple drawing dies as blank straps 420 are conveyed along circuit 630. This is automatically accomplished by operation of the computer program stored in computer 650. Alternatively, if dimples 360/370 are not desired, then the blank straps 420 may pass under the dimple drawing dies; however, the computer program will not cause cylinders 500, corresponding to the dimple drawing dies, to actuate. Similarly, although not preferred, trihedral drawing die 720 may be bypassed or deactivated by the computer program so that the trihedral shape of the exterior straps 190a/190b are not formed. In this instance, the six side panels 200, rather than the two trihedral exterior straps 190a/190b, are individually formed from blank straps 420, the six side panels 200 then being suitably arranged and laser welded together so as to form the hexagonal transverse contour of outer strap 180.

It will be further understood that, according to the method of the invention, the metal working operations used in making lattice member 170 may be performed in any suitable order or sequence for providing a flexible means for making lattice member 170 depending on the spatial arrangement of the piercing, drawing, lancing and coining die assemblies 490.

Moreover, it will be appreciated that in the preferred method of making lattice member 170, only two exposed edges (i.e., edges 195a/195b) belonging to trihedral exterior straps 190a/190b are formed rather than six exposed edges. This is important because welding only two exposed edges, rather than six exposed edges, reduces the number of edges to be welded and thus the time for fabricating outer strap 180. In addition, having only two exposed edges results in a hexagonal lattice member 170 having only two discontinuities (i.e., slightly exposed welded edges 195a/195b). This is also important because having only two rather than six exposed edges reduces the risk of snagging or "hang-up" and resulting damage to lattice member 170 as fuel assembly 10 is manipulated in the reactor core during reactor refueling operations.

Although the invention is illustrated and described herein in its preferred embodiments, it is not intended that the invention as illustrated and described be limited to the details shown, because various modifications may be obtained with respect to the invention without departing from the spirit of the invention or the scope of equivalents thereof. For example, each die assembly 490 may be so-called "compound dies" rather than only a single piercing die or a single drawing die. That is, each die assemblies 490 may include both a piercing and drawing die in order to limit the total number of individual die assemblies 490. This would reduce the overall size of progressive die machine 470 and thus conserve space.

Therefore, what is provided is a method of making a fuel assembly lattice member and the lattice member made by such method.

What is claimed is:

1. A method of making a lattice member, comprising the steps of:
 (a) controllably moving conveyor means for conveying a plurality of interior and a plurality of exterior strap members therealong;
 (b) advancing each interior and each exterior strap member into alignment with a deflector vane piercing die by controllably moving the conveyor means;
 (c) actuating the deflector vane piercing die, so that each interior and each exterior strap member is pierced to form a deflector vane thereon;
 (d) advancing each interior and each exterior strap member into alignment with a deflector vane drawing die by controllably moving the conveyor means;
 (e) actuating the deflector vane drawing die, so that the deflector vane is drawn into a predetermined curvature;
 (f) advancing a pair of the exterior strap members into alignment with a trihedral drawing die by controllably moving the conveyor means; and
 (g) actuating the trihedral drawing die to draw each exterior strap member, so that each of the pair of exterior strap members obtains a trihedral-shaped cross section.

2. The method of claim 1, further comprising the steps of:
(a) advancing each interior and each exterior strap member into alignment with a spring drawing die by controllably moving the conveyor means; and
(b) actuating the spring drawing die, so that each interior and each exterior strap member is drawn to form a spring member thereon.

3. The method of claim 2, further comprising the steps of:
(a) joining the pair of exterior strap members to form a unitary outer strap member having a hexagon-shaped cross section;
(b) joining the interior strap members so as to form a plurality of intersecting first and second inner strap members defining a plurality of rhombic-shaped rod cells and a plurality of generally rhombic-shaped thimble cells; and
(c) joining the first and second inner strap members to the interior of the outer strap member.

4. The method of claim 1, further comprising the step of trimming each interior and each exterior strap member.

5. The method of claim 4, wherein said step of trimming each interior and each exterior strap member comprises the steps of:
(a) advancing each interior and each exterior strap member into alignment with a trimming die by controllably moving the conveyor means; and
(b) actuating the trimming die, so that each interior and each exterior strap member is trimmed.

6. The method of claim 1, further comprising the step of coining each exterior strap member.

7. The method of claim 6, wherein said step of coining each exterior strap member comprises the steps of:
(a) advancing each exterior strap member into alignment with a coining die by controllably moving the conveyor means: and
(b) actuating the coining die, so that each exterior strap member is coined.

8. In a progressive die machine, a method of making a lattice member for a fuel assembly, the method comprising the steps of:
(a) controllably moving a motorized conveyor along a predetermined circuit extending through the die machine by operating a pre-programmed computer for conveying a plurality of interior and a plurality of exterior strap members along the circuit, each interior and each exterior strap member engaging the conveyor;
(b) successively advancing each interior and each exterior strap member along the circuit and into coaxial alignment with a preselected pneumatically actuatable deflector vane piercing die by controllably moving the conveyor;
(c) selectively pneumatically actuating the deflector vane piercing die by operating the computer, so that each interior and each exterior strap member is pierced to form a plurality of deflector vanes thereon;
(d) successively advancing each interior and each exterior strap member along the circuit and into coaxial alignment with a preselected pneumatically actuatable deflector vane drawing die by controllably moving the conveyor;

(e) selectively pneumatically actuating the deflector vane drawing die by operating the computer, so that each deflector vane is drawn into a predetermined curvature for forming a plurality of curved deflector vanes in each interior and each exterior strap member as said deflector vane drawing die is actuated;
(f) successively advancing each of the interior and each of the exterior strap members along the circuit and into alignment with a preselected pneumatically actuatable spring drawing die by controllably moving the conveyor; and
(g) selectively pneumatically actuating the preselected spring drawing die by operating the computer to draw a plurality of raised portions extending from each interior and exterior strap member, so that the raised portions define a plurality of spring members in each interior and each exterior strap member as said spring drawing die is actuated.
(h) successively advancing a preselected pair of exterior strap members along the circuit and into alignment with a preselected pneumatically actuatable trihedral drawing die by controllably moving the conveyor;
(i) selectively pneumatically actuating the preselected trihedral drawing die by operating the computer to successively draw each of the exterior strap members, so that each exterior strap member obtains a regular trihedral-shaped transverse cross section;
(j) joining the pair of trihedral-shaped exterior strap members one to another by activating a laser welding device so that the trihedral-shaped exterior strap members form a unitary outer strap member defining a regular hexagon in transverse cross section, the outer strap member having an interior wall;
(k) joining the interior strap members one to another by activating the laser welding device so as to form a plurality of intersecting first and second inner strap members defining a plurality of rhombic-shaped rod cells and a plurality of generally rhombic-shaped thimble cells, the first and second inner strap members each having end portions;
(l) surrounding the plurality of first and second inner strap members with the outer strap member; and
(m) joining the end portions of each of the first and second inner strap members to the interior wall of the outer strap member by activating the laser welding device.

9. The method of claim 8, further comprising the steps of:
(a) successively advancing each interior and each exterior strap member along the circuit and into alignment with a preselected pneumatically actuatable trimming die by controllably moving the conveyor; and
(b) selectively pneumatically actuating the preselected trimming die by operating the computer, so that each interior and each exterior strap member is pierced to trim each interior and each exterior strap member.

10. The method of claim 8, further comprising the steps of:
(a) successively advancing each exterior strap member along the circuit and into alignment with a preselected pneumatically actuatable coining die by controllably moving the conveyor; and (b) selectively pneumatically actuating the preselected coining die by operating the computer, so that each exterior strap member is drawn to coin each exterior strap member.

11. A lattice member made by the method of claim 8, comprising:
   (a) an outer strap member having a hexagonal transverse contour;
   (b) a plurality of parallel first inner strap members extending transversely interiorly of said outer strap member, each of said first inner strap, strap members having end portions thereof attached to said outer strap member;
   (c) a plurality of parallel second inner strap members extending transversely interiorly of said outer strap member, each of said second inner strap members having end portions thereof attached to said outer strap member, each of said second inner strap members intersecting each of said first inner strap members at a predetermined angle with respect thereto for defining a plurality of rhombic-shaped rod cells and a plurality of generally rhombic-shaped thimble cells for receiving respective ones of a plurality of fuel rods and thimble tubes; and
   (d) deflector means associated with each rod cell and attached to said outer strap member and to each of said first and second inner strap members for deflecting a component of a fluid stream onto the fuel rods.

12. The lattice member according to claim 11, further comprising a plurality of resilient spring members associated with each fuel rod and formed from the outer strap member and from each of the first and second inner strap members, each of said spring members engaging its respective fuel rod for supporting the fuel rod.

13. A lattice member, comprising:
   (a) an outer strap member having a hexagonal transverse cross section formed by engaging a pair of exterior strap members with a computer controlled conveyor, successively advancing each of the pair of exterior strap members into coaxial alignment with a trihedral drawing die by controllably moving the conveyor, actuating the trihedral drawing die to draw each of the exterior strap members into a trihedron by operating a computer, joining the exterior strap members by activating a laser welding device so that the pair of exterior strap members define a hexagon in transverse cross section to form said outer strap member;
   (b) a plurality of parallel first inner strap members joined to said outer strap member by activating the laser welding device, each of said first inner strap members extending transversely interiorly of said outer strap member;
   (c) a plurality of parallel second inner strap members joined to said outer strap member by activating the laser welding device, each of said second inner strap members extending transversely interiorly of said outer strap member, each of said second inner strap members intersecting each of said first inner strap members at a predetermined angle with respect to each of said first inner strap members for defining a plurality of rhombic-shaped rod cells and a plurality of generally rhombic-shaped thimble cells; and
   (d) deflector means associated with each of the rod cells and attached to said first inner, second inner, and outer strap members for deflecting a component of a fluid flowing past said strap members, said deflector means formed by engaging said first inner, second inner, and outer strap members with the conveyor, advancing each of said first inner, second inner, and outer strap members into alignment with a deflector vane piercing die by controllably moving the conveyor, actuating the deflector vane piercing die by operating the computer so that each strap member is pierced to form said deflector means on each strap member, advancing each of said first inner, second inner, and outer strap members into alignment with a deflector vane drawing die by controllably moving the conveyor, actuating the deflector vane drawing die by operating the computer so that said deflector means is drawn into a predetermined curvature.

14. The lattice member according to claim 13, wherein said outer strap member, each of said first inner strap members and each of said second inner strap members further comprise resilient spring means formed therefrom by advancing each of said strap members into alignment with a spring drawing die and actuating the spring drawing die to draw a raised portion from each of said strap members.

15. A lattice member for a fuel assembly, the lattice member capable of maintaining a plurality of elongate fuel rods and plurality of elongate thimble tubes in spaced parallel array, the lattice member comprising:
   (a) an outer strap member having a regular hexagonally-shaped transverse contour formed by engaging a preselected pair of exterior strap members with a computer controlled motorized conveyor extending along a predetermined circuit extending through a progressive die machine, successively advancing the pair of exterior strap members along the circuit and into coaxial alignment with a preselected pneumatically actuatable trihedral drawing die by controllably moving the conveyor, selectively pneumatically actuating the trihedral drawing die by operating the computer to successively draw each exterior strap members into a regular trihedron, joining the exterior strap members by activating a laser welding device so that the exterior strap members define a regular hexagon in transverse cross section, said outer strap member having at least one elongate side panel;
   (b) a plurality of elongate parallel first inner strap members each having end portions thereof joined to said outer strap member by activating a laser welding device, each of said first inner strap members extending transversely interiorly of said outer strap member parallel to the side panel of said outer strap member;
   (c) a plurality of elongate parallel second inner strap members each having end portions thereof joined to said outer strap member by activating the laser welding device, each of said second inner strap members extending transversely interiorly of said outer strap member, each of said second inner strap members intersecting each of said first inner strap members at a predetermined angle with respect to each of said first inner strap members, so that a plurality of rhombic-shaped rod cells are defined to receive respective ones of the fuel rods and so that a plurality of generally rhombic-shaped thimble cells are defined to receive respective ones of the thimble tubes, whereby the plurality of fuel rods and the plurality of thimble tubes are maintained in spaced parallel array as the fuel rods and the thimble tubes are received through their respective rod cells and thimble cells; and (d) a plurality of deflector vanes associated with each of the rod cells and integrally attached to each of said first and second inner strap members and to said outer strap member, each of said deflector vanes being formed by engaging said first and second inner strap members and said outer strap members with the conveyor, engaging each of said first, second and outer strap members with the conveyor, successively advancing each of said first, second and outer strap members along the circuit and into coaxial alignment with a preselected pneumatically actuatably deflector vane piercing die by controllably moving the conveyor, selectively pneumatically actuating the deflector vane piercing die by operating the computer so that each first, second and outer strap member is pierced to form the plurality of said deflector vanes on each first, second and outer strap member, successively advancing each of said first, second and outer strap members along the circuit an into coaxial alignment with a preselected pneumatically actuatable deflector vane drawing die by controllably moving the conveyor, selectively pneumatically actuating the deflector vane drawing die by operating the computer so that each of said deflector vanes is drawn into a predetermined curvature.

16. The lattice member according to claim 15, wherein said outer strap member, each of said first inner strap members and each of said second inner strap members further comprise a plurality of resilient spring members formed therefrom by successively advancing each strap member along the circuit and into coaxial alignment with a preselected pneumatically actuatable spring drawing die by controllably moving the conveyor and selectively pneumatically actuating the spring drawing die by operating the computer to draw a plurality of raised portions outwardly extending from each strap member.

* * * * *